United States Patent [19]

Lin

[11] Patent Number: 5,676,228
[45] Date of Patent: Oct. 14, 1997

[54] REAR HUB STRUCTURE FOR BICYCLES

[76] Inventor: Chun-Huo Lin, 65, Hsiao Wu Road, Chu Ying Li, Ho-Mei Town, Changhua, Taiwan

[21] Appl. No.: 601,353

[22] Filed: Feb. 16, 1996

[51] Int. Cl.$^6$ ............................................. F16D 41/30
[52] U.S. Cl. ............................................. 192/64
[58] Field of Search ........................... 192/64; 301/110.5

[56] References Cited

U.S. PATENT DOCUMENTS

| | | | |
|---|---|---|---|
| 5,492,211 | 2/1996 | Wu | 192/64 X |
| 5,518,096 | 5/1996 | Lin | 192/64 |

Primary Examiner—Rodney H. Bonck
Attorney, Agent, or Firm—Beveridge, DeGrandi, Weilacher & Young LLP

[57] ABSTRACT

An improved rear hub structure for bicycles includes a rear hub housing and a driving device. The driving device has a securing seat, multiple spring elements, multiple stop elements and a gear seat. The securing seat has a stem projecting from one end thereof. An iron washer with an embossed surface is disposed between the stem of the securing seat and a threaded slot of a through hole defined in the rear hub housing. The embossed surface of the iron washer contacts the threaded slot to prevent relative rotation. The stem of the securing seat has inner threads for engaging outer threads of a threaded rod. The threaded rod and the securing seat are locked together to prevent the securing seat from moving further toward the threaded slot of the through hole when the rear hub housing rotates forwardly. The iron washer prevents the stem of the securing seat from directly pressing against the rear hub housing and thus prevents it from deforming.

2 Claims, 4 Drawing Sheets

REAR HUB STRUCTURE FOR BICYCLES

BACKGROUND OF THE INVENTION (a) Field of the Invention

The present invention relates generally to a rear hub structure for bicycles, and more particularly to an improved rear hub structure for strengthening the coupling of a securing seat and a rear hub housing so as to enhance the life of the bicycle.

(b) Description of the Prior Art

Aluminum alloys which are lighter than iron have been widely used in manufacturing bicycles. However, one disadvantage with using aluminum alloys is that they are relatively soft. As a consequence, aluminum and iron are both used in the making of rear hub mechanisms for bicycles.

With reference to FIGS. 1 and 2, a conventional rear hub structure of the bicycle essentially comprises a rear hub housing A having a central through hole A1 for insertion of a shaft B therethrough. The rear hub housing A has one end thereof provided with a ball bearing slot A2 for receiving, in sequence, a socket A21, a ball seat A22 and a first bushing A23. At the other end of the rear hub housing A, the through hole A1 is internally provided with a threaded slot A3 such that the shaft B may be positioned in the rear hub housing A by means of a first nut A24 screwably fastened to the shaft B. The conventional rear hub structure further comprises a driving means consisting of a securing seat C, a predetermined number of stop elements D and a gear seat F. The securing seat C is circumferentially provided with a predetermined number of notches C1 for receiving the stop elements D. The stop elements, in turn, are subjected to the urging force of a plurality of spring elements E. Besides, a threaded stem C2 projects from one end of the securing seat C and has an opening to allow to pass through the shaft B so that the outer threads C3 can lock with the threaded slot A3 of the through hole A1 of the rear hub housing A. The gear seat F is internally and circumferentially provided with a rack F1 near one end thereof for engaging the stop elements D of the securing seat C. The gear seat F further has the other end thereof fitted with a ball race G and a protector G1. These components are positioned in place on the rear hub housing A by means of a second bushing G2, a sleeve G3 and a second nut G4. In addition, a chain sprocket may be fixedly provided around the outer circumference of the gear seat F such that, when the chain sprocket is driven, the rear hub housing A may be caused to rotate in a single direction.

In the rear hub structure of the prior art, since the outer threads C3 of the threaded stem C2 are locked with the threaded slot A3 of the rear hub housing A and since the rear hub housing A is made of soft aluminum material whereas the securing seat C is made of iron, when the securing seat C rotates forwardly, it may lock deeper into the rear hub housing A and the hard threaded stem C2 directly presses against the rear hub housing A, causing it to deform in shape after a period of use. Besides, as the part of the rear hub housing A serving as a baffle against the threaded stem C2 of the securing seat C is also made of soft material, the part of the rear hub housing A which is in direct contact with the securing seat C will sink or collapse after prolonged pressure. As a result, the securing seat C will sink deeper and deeper into the threaded slot A3 of the through hole A1 of the rear hub housing 1, affecting the precision of their connection, so that the threads of the threaded slot A3 will become damaged. Consequently, the engagement of securing seat C and the threaded slot A3 of the through hole A1 of the rear hub housing 1 will become loosened, causing the gear to deflect to an extent that the chain may slip off. Worse still, the chain pins may slip off so that the chain breaks, which is very dangerous to the cyclist. Besides, the defective rear hub mechanism will affect the life of the bicycle.

SUMMARY OF THE INVENTION

Accordingly, a primary object of the present invention is to provide an improved rear hub structure for bicycles to eliminate the drawbacks in the prior art.

In order to achieve the above-mentioned object, the improved rear hub structure according to the present invention essentially comprises a rear hub housing with a central through hole for accommodating a shaft, the through hole having a threaded slot formed at one end thereof, a driving means consisting of a securing seat, a plurality of spring elements, a plurality of stop elements, and a gear seat. The securing seat is provided with a threaded stem at one end thereof. An iron washer is disposed between the bottom side of the threaded slot and the threaded stem; the side of the iron washer in direct contact with the bottom side of the threaded slot is provided with an embossed upper surface for preventing the iron washer from rotation. Besides, the threaded stem has a plurality of inner threads for engaging a plurality of outer threads of a threaded rod fitted within the through hole. By means of the firm connection of the securing seat and the threaded rod, the threaded stem of the securing seat may be prevented from driving forwardly into the threaded slot of the through hole and pressing directly against the relatively softer rear hub housing to cause it to deform in shape.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
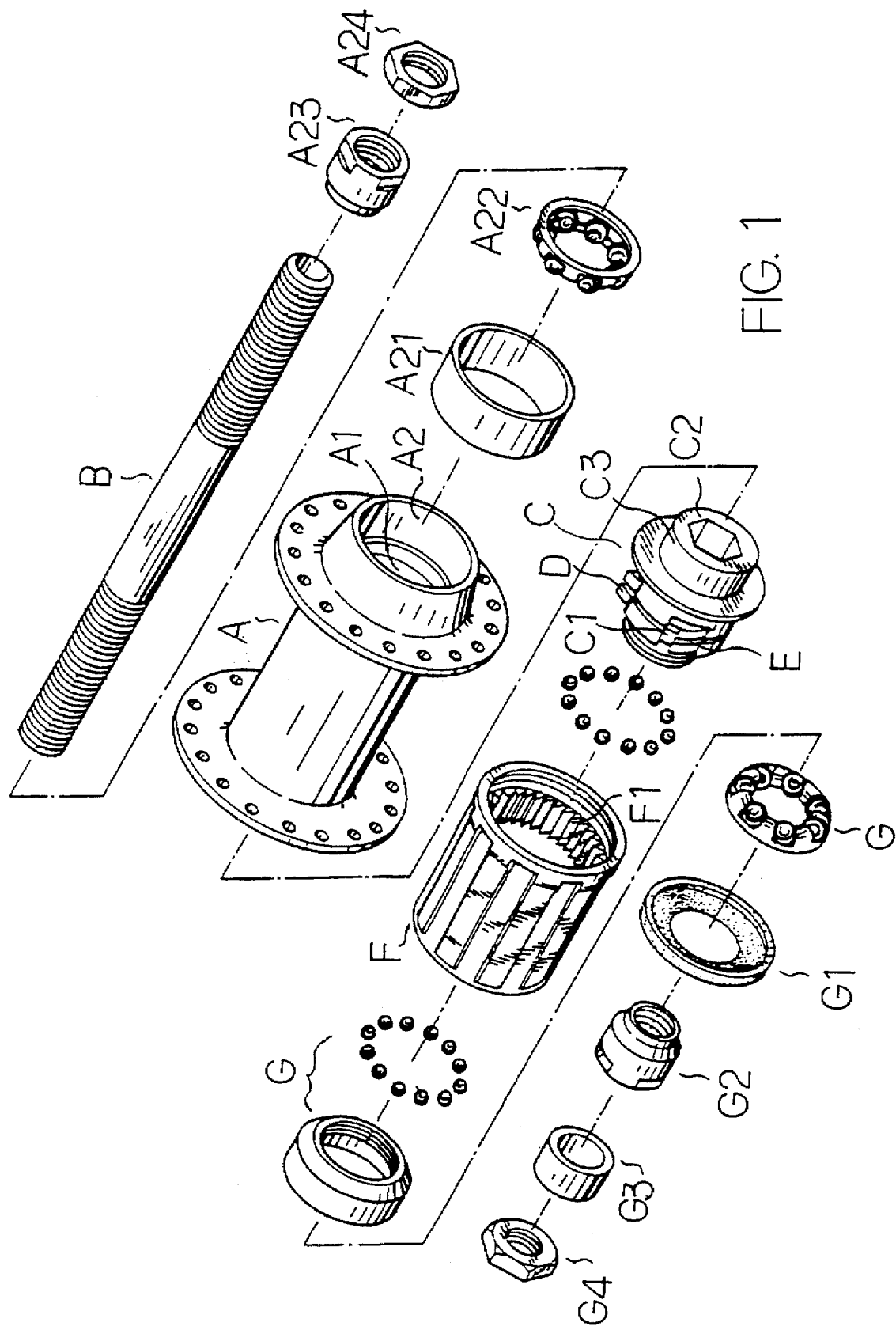
FIG. 1 is a schematic exploded view of a conventional rear hub structure.
Figure 2:
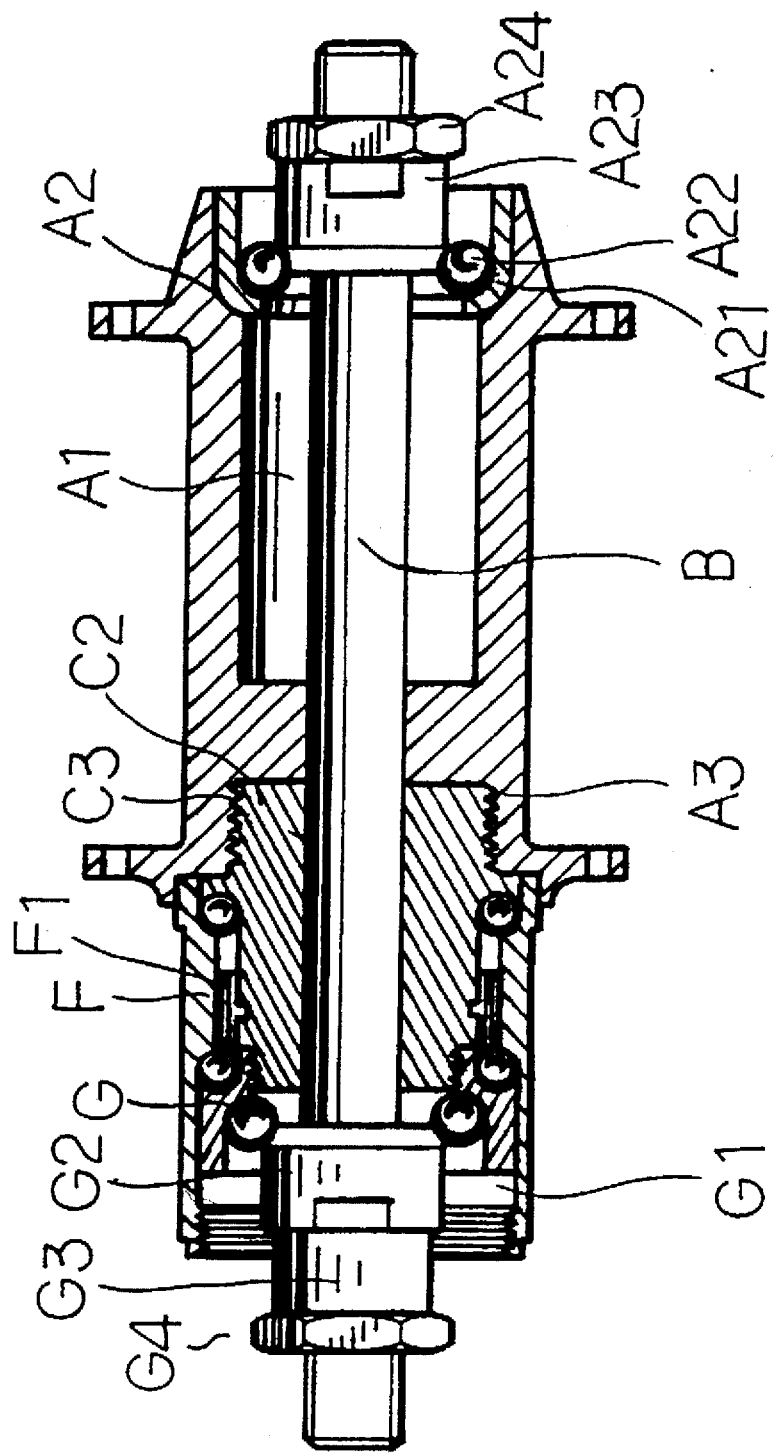
FIG. 2 is a schematic sectional view of the conventional rear hub structure in an assembled state.
Figure 3:
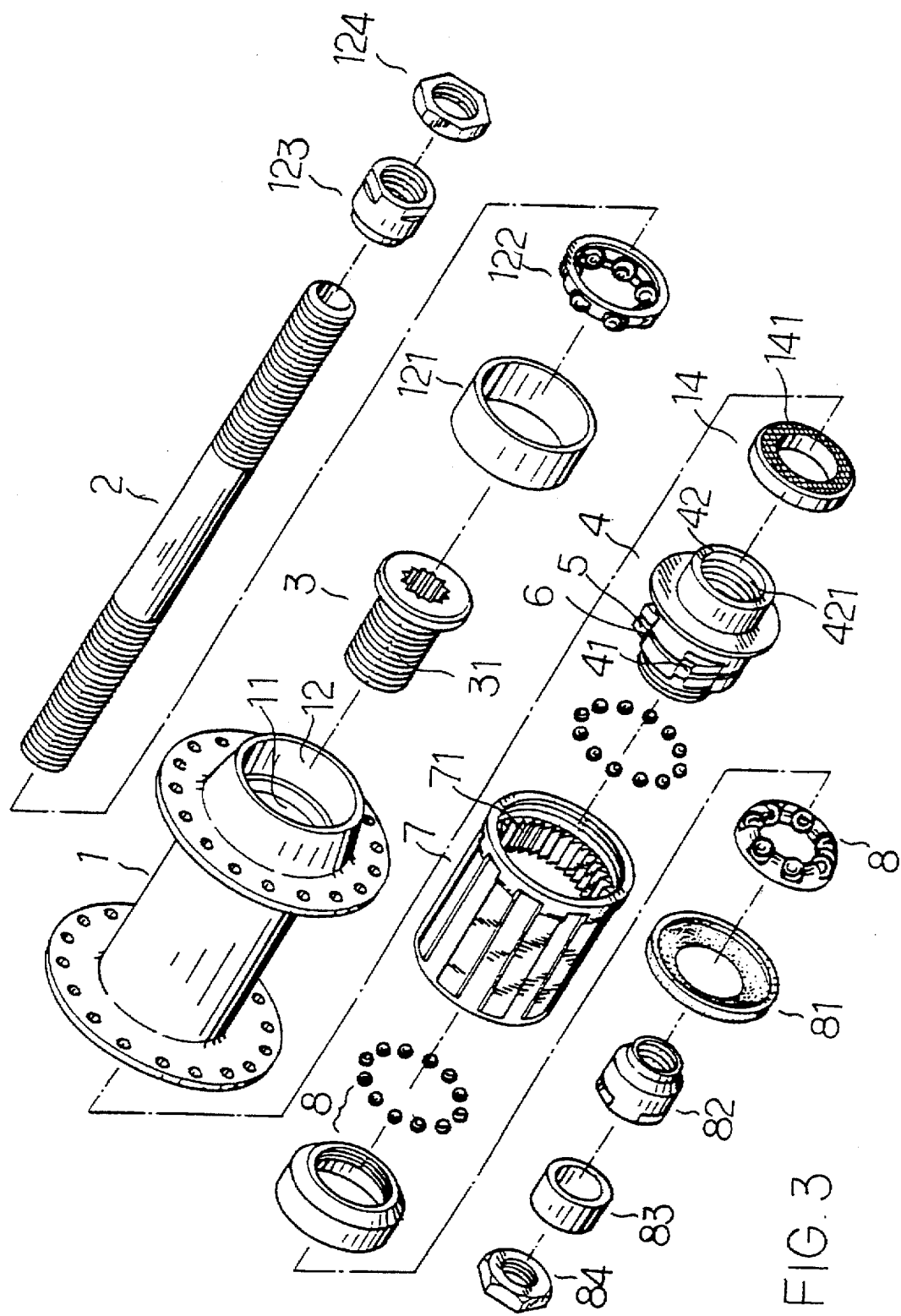
FIG. 3 is a schematic exploded view of the improved rear hub structure according to the present invention.
Figure 4:
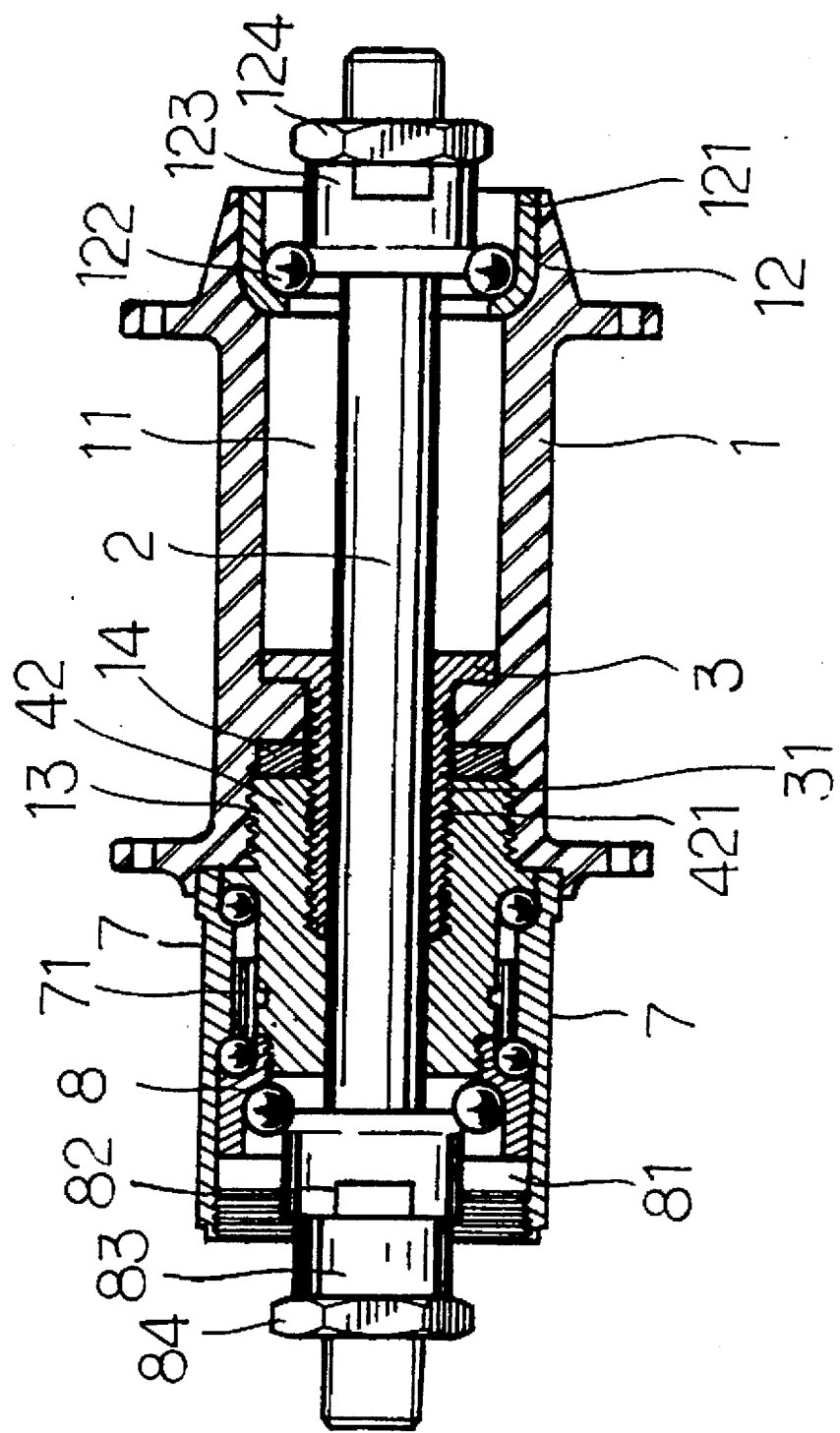
FIG. 4 is a schematic sectional view of the improved rear hub structure according to the present invention.

With reference to FIGS. 3 and 4, the improved rear hub structure of the bicycle according to the present invention essentially comprises a rear hub housing 1 having a central through hole 11 for insertion of a shaft 2 therethrough. The rear hub housing 1 has one end thereof provided with a ball bearing slot 12 for receiving, in sequence, a socket 121, a ball seat 122 and a first bushing 123. At the other end of the rear hub housing 1, the through hole 11 is internally provided with a threaded slot 13 such that the shaft 2 may be positioned in the rear hub housing 1 by means of a first nut 124 screwably fastened to the shaft 2. The rear hub structure of the present invention further comprises a driving means consisting of a securing seat 4, a predetermined number of stop elements 5 and a gear seat 7. The securing seat 4 is circumferentially provided with a predetermined number of notches 41 for receiving the stop elements 5. The stop elements, in turn, are subjected to the urging force of a plurality of spring elements 6. Besides, a threaded stem 42 projects from one end of the securing seat 4 and has an opening to allow the shaft 2 to pass through and can be locked with the threaded slot 13 of the through hole 11 of the rear hub housing 1. The gear seat 7 is internally and circumferentially provided with a rack 71 near one end thereof for engaging the stop elements 5 of the securing seat 4. The gear seat 7 further has the other end thereof fitted with a ball race 8 and a dust protector 81. These components are positioned in place on the rear hub housing 1 by means of a second bushing 82, a sleeve 83 and a second nut 84. In addition, a chain sprocket may be fixedly provided at the outer circumference of the gear seat 7 such that, when the chain sprocket is driven, the rear hub housing 1 may be caused to rotate in a single direction.

The present invention is characterized in that an iron washer 14 is fitted between the threaded slot 13 of the through hole 11 of the rear hub housing 1 and the threaded stem 42 of the securing seat 4 and that, where its upper side is in contact with the bottom side of the threaded slot 13, the iron washer 14 is provided with an embossed surface 141 to prevent the iron washer 14 from rotating. The threaded stem 42 of the securing seat 4 has a plurality of inner threads 421 for locking with a plurality of outer threads 31 of a threaded rod 3 fitted within the through hole 11 of the rear hub housing 1.

By means of the above-described arrangement, when the rear hub housing 1 is rotated forwardly by means of the chain sprocket on the gear seat 7, the rack 71 of the gear seat 7 engages the stop elements 5 of the securing seat 4 so that the securing seat 4 brings the rear hub housing 1 to rotate forwardly in a synchronously manner. But when the chain sprocket rotates rearwardly, the rack 71 of the gear seat 7 disengages the stop elements 5 of the securing seat 4 to generate idle rotation. Besides, as the threaded rod 3 and the securing seat 4 are firmly locked together, the threaded stem 42 of the securing seat 4 may be prevented from driving further forwardly into the threaded slot 13 of the rear hub housing 1 when the rear hub housing 1 rotates forwardly. Additionally, as the iron washer 14 is made of hard material, the threaded stem 42 of the securing seat 4 may be prevented from directly pressing against the relatively softer rear hub housing 1 to cause it to become deformed, resulting in loose connection.

In view of the aforesaid, the improved rear hub structure according to the present invention effectively enhances the coupling of the securing seat 4 and the rear hub housing 1 and their stability and thus increases the life of the bicycle.

Although the present invention has been illustrated and described with reference to the preferred embodiment thereof, it should be understood that it is in no way limited to the details of such embodiment but is capable of numerous modifications within the scope of the appended claims.

What is claimed is:

1. A rear hub structure for bicycles, comprising:

a rear hub housing having a central hole defined therethrough for receiving a shaft therein, said rear hub housing having one end thereof provided with a ball bearing slot for receiving, in sequence, a socket, a ball seat and a first bushing, a threaded rod being disposed in said central hole in said rear hub housing, a first nut engaging an end of said shaft, and a driving means consisting of a securing seat, a predetermined number of stop elements and a gear seat, said securing seat being circumferentially provided with a predetermined number of notches for receiving said stop elements, said stop elements biased outwardly by a plurality of spring elements, said securing seat further having a threaded stem projecting from one end thereof, said threaded stem having an opening defined therein for receiving said shaft, said threaded stem being engaged with a threaded slot defined in an end of said central hole of said rear hub housing, said gear seat being internally and circumferentially provided with a rack proximal to one end thereof for engaging said stop elements of said securing seat, said gear seat having an other end thereof fitted with a ball race and a dust protector, a second bushing, a sleeve and a second nut pressing said gear seat against said rear hub housing, wherein when said gear seat is rotated, the rear hub housing is rotated in a single direction, and wherein an iron washer is disposed between said threaded stem of said securing seat and a portion of said central hole defining an internal end of said threaded slot of said central hole defined in said rear hub housing, and said threaded stem is provided with a plurality of inner threads for engagement with a plurality of outer threads of said threaded rod.

2. A rear hub structure as defined by claim 1, wherein a side of said iron washer which is in contact with said portion of said central hole defining said internal end of said threaded slot is provided with an embossed surface for preventing said iron washer from rotation.

* * * * *